United States Patent Office 3,850,999
Patented Nov. 26, 1974

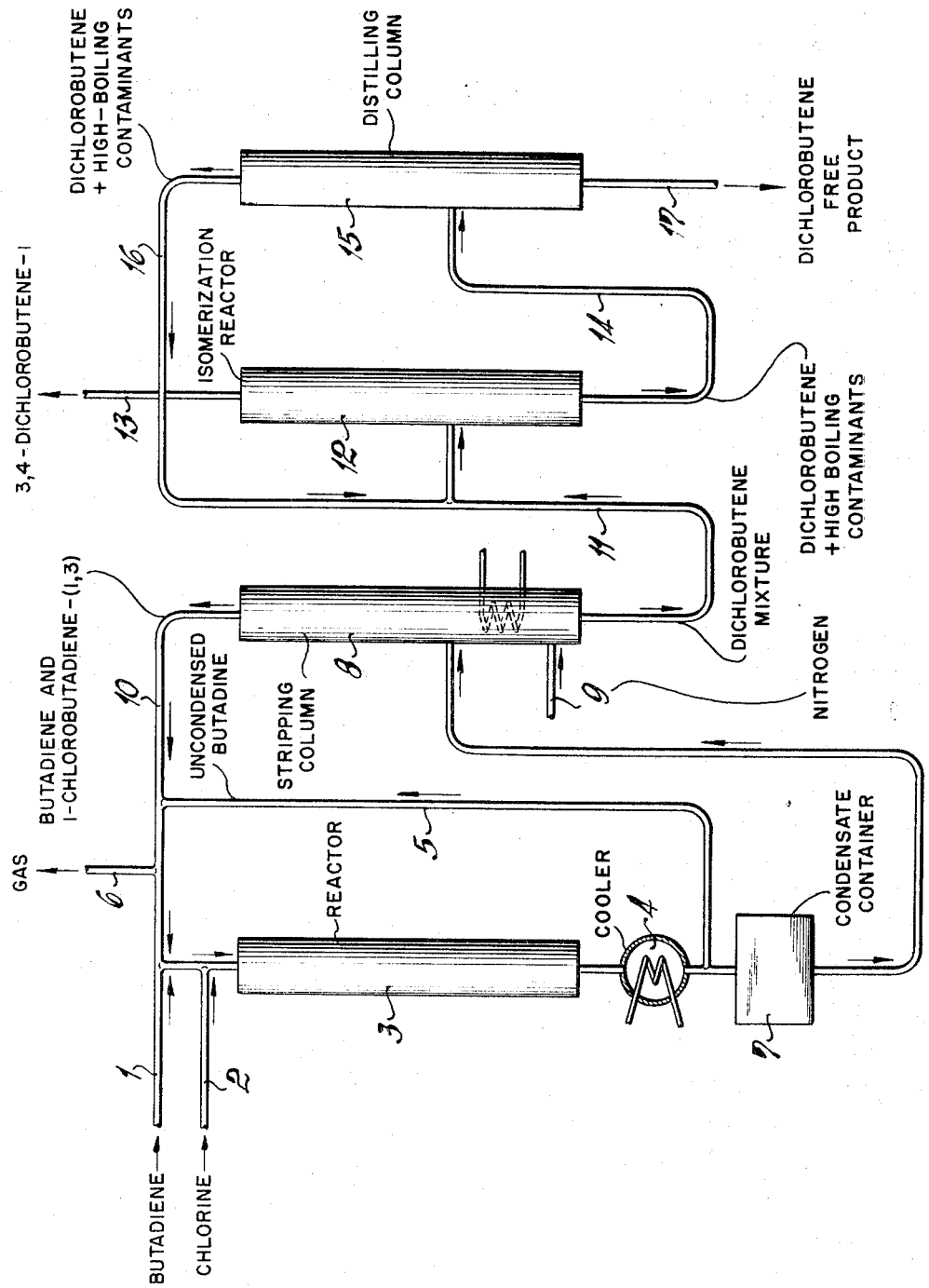

3,850,999
PROCESS FOR THE MANUFACTURE OF
3,4-DICHLOROBUTENE-1
Klaus Gehrmann, Hurth-Knapsack, Alexander Ohorodnik, Erftstadt-Liblar, Udo Dettmeier, Okriftel, and Heinz-Josef Berns, Hurth-Berrenrath, Germany, assignors to Knapsack Aktiengesellschaft, Knapsack, Germany
Filed Aug. 4, 1972, Ser. No. 277,873
Claims priority, application Germany, Aug. 18, 1971,
P 21 41 312.7
Int. Cl. C07c 21/02
U.S. Cl. 260—654 R
2 Claims

ABSTRACT OF THE DISCLOSURE

Production of 3,4-dichlorobutene-1 by gas phase-chlorination of butadiene at temperatures higher than 200° C., isomerization of the resulting dichlorobutene mixture in the presence of a catalyst, and distilling off 3,4-dichlorobutene-1 consistently with its formation. More particularly, the mixture of crude dichlorobutenes is subjected to treatment with an inert propellent gas so as to expel 1-chlorobutadiene-(1,3) and butadiene in excess therefrom and recycle them to the reaction zone. The mixture so treated and having high-boiling contaminants therein ($bp_{760} > 155°$ C.) is delivered to an isomerization stage and treated therein so as to distill off 3,4-dichlorobutene-1 overhead and remove base product therefrom. The base product is treated so as to isolate a dichlorobutene-containing distillate from the high-boiling contaminants ($bp_{760} > 155°$ C.), and the distillate is recycled to the isomerization stage.

---

The present invention relates to the production of 3,4-dichlorobutene-1 by gas phase-chlorination of butadiene at temperature higher than 200° C., isomerization of the resulting dichlorobutene mixture in the presence of a catalyst, and distilling off 3,4-dichlorobutene-1 consistently with its formation.

3,4-Dichlorobutene-1 is an important starting material for making 2-chlorobutadiene-(1,3). In industry, 3,4-dichlorobutene is produced by the conventional chlorination of butadiene-(1,3), in gas phase. The reaction product, which substantially consists of 3,4-dichlorobutene-1 and cis- and trans-1,4-dichlorobutenes-2, contains as further constituents low-boiling fractions (butadiene, 1-chlorobutadiene-(1,3)) and high-boiling contaminants (trichlorobutenes) in varying concentrations. This crude reaction product is most commonly worked-up by the steps comprising expelling unreacted butadiene, subjecting the balance of the crude product to preliminary distillation so as to separate the isomeric dichlorobutenes from the high-boiling fractions, and finally isomerizing 1,4-dichlorobutene-2 in contact with a catalyst so as to effect rearrangement to 3,4-dichlorobutene-1 (cf. German published Specification DOS 1,950,971, for example).

Following the teachings of German Patent 1,220,847, it is necessary to carry out the preliminary distillation in order to obtain constant yields. Failing this, the reaction mixture is said to solidify and form a gel (cf. comparative Example 3 hereinafter).

We have now unexpectedly discovered that the high-boiling contaminants need not be separated prior to isomerization, provided that crude product free from 1-chlorobutadiene-(1,3) is subjected to isomerization.

The process of the present invention comprises more particularly subjecting the mixture of crude dichlorobutenes to treatment with an inert propellent gas so as to expel 1-chlorobutadiene-(1,3) and butadiene in excess therefrom; recycling the said 1-chlorobutadiene-(1,3) and the said butadiene to the reaction zone; delivering the mixture so treated and having high-boiling contaminants therein ($bp_{760} > 155°$ C.) to an isomerization stage and treating the mixture therein so as to distil off 3,4-dichlorobutene-1 overhead and remove base product therefrom; treating the said base product so as to isolate a dichlorobutene-containing distillate from the said high-boiling contaminants ($bp_{760} > 155°$ C.), and recycling the said distillate to the isomerization stage.

Further preferred embodiments of the process of the present invention invention, which can be used singly or in combination, provide:

(a) for butadiene and chlorine to be reacted continuously in the reaction zone at temperatures between 210 and 270° C.; for the resulting reaction gases to be cooled; for gaseous butadiene in excess to be recycled to the reaction zone; for condensate, which is obtained upon effecting the cooling step and which substantially consists of 3,4-dichlorobutene-1, cis- and trans-1,4-dichlorobutenes-2, minor proportions of butadiene, 1-chlorobutadiene-(1,3) and high-boiling contaminants, to be introduced into a stripping zone; for the condensate to be treated therein at temperatures between 40 and 120° C. and while passing an inert gas therethrough, so as to isolate 1-chlorobutadiene-(1,3) and butadiene overhead, and for the 1-chlorobutadiene-(1,3) and the butadiene so isolated to be recycled to the reaction zone; for the 1-chlorobutadiene-(1,3) to be converted to high-boiling, higher-chlorinated substances and for base product with the high-boiling contaminants therein to be delivered to an isomerization stage; for 1,4-dichlorobutene-2 to be isomerized therein to 3,4-dichlorobutene-1 at temperatures between 85 and 110° C.; for the 3,4-dichlorobutene-1 to be distilled off continuously overhead and for base product to be delivered to a distilling zone maintained at temperatures between 85 and 110° C.; for distillate, which substantially contains 1,4-dichlorobutene-2 to be removed overhead under reduced pressure; and for the distillate to be recycled to the isomerization stage; and for the high-boiling contaminants, which accumulate in the bottom portion of the distilling zone, to be removed therefrom;

(b) for the inert gas, which is continuously passed through the stripping zone, to be partially removed together with proportionate fractions of butadiene and 1-chlorobutadiene-(1,3) from the reaction cycle at a place between the stripping zone and the reaction zone, and for the butadiene to be recovered therefrom.

The distillate coming from the stripping zone, which substantially consists of nitrogen, butadiene and 1-chlorobutadiene-(1,3) should not be allowed to escape into the open air, as it contains too much valuable butadiene. On the other hand, the separate recovery of butadiene would be an energetically too costly procedure. It is therefore good practice to recycle the butadiene in admixture with nitrogen and 1-chlorobutadiene-(1,3) to the reaction zone, in which 1-chlorobutadiene-(1,3) undergoes further reaction with the resultant formation of high-boilers that do not affect the subsequent isomerization of 3,4-dichlorobutene-1. In view of the fact, however, that the stripping zone is continuously supplied with nitrogen, it is advantageous continuously to remove a portion of nitrogen-containing recycle gas therefrom and convert it to butadiene (cf. comparative Example 2 hereinafter). The useful isomerization catalysts include, for example, conventional copper catalysts. The distillation zone should preferably be operated under pressures between 50 and 100 mm. of mercury.

By the process of the present invention, 3,4-dichlorobutene-1 is easier to produce and in improved yields, per unit of time, than heretofore.

A preferred variant of the process of the present invention will now be described with reference to the accompanying flow scheme.

Butadiene travelling through conduit 1 and chlorine travelling through conduit 2 are introduced into reactor 3 and reacted therein in gas phase. The resulting reaction mixture is condensed in cooler 4 and uncondensed butadiene in excess is recycled to the reactor, through conduits 5 and 10. Condensate 7 is introduced into stripping column 8, in which butadiene and 1-chlorobutadiene-(1,3) (head product) are expelled by means of a nitrogen propellent gas coming from conduit 9. The head product is recycled to reactor 3, through conduit 10. Branch line 6 is used for the continuous removal of a portion of recycle gas so as to avoid an undesirable increase of the nitrogen concentration therein. The base product, which accumulates in stripping column 8, is fed through conduit 11 to isomerization reactor 12, and the dichlorobutene mixture is isomerized therein in contact with a copper catalyst. 3.4-Dichlorobutene-1 is removed through head line 13 consistently with its formation and a base product containing high-boiling contaminants together with dichlorobutenes is removed from below, through conduit 14. The base product is introduced into distilling column 15 and a head product is removed therefrom, through conduit 16. The head product substantially contains dichlorobutenes together with some high-boiling contaminants and can be recycled to isomerization reactor 12. The product accumulating in the base portion of distilling column 15 is practically free from dichlorobutenes and is discarded, through conduit 17.

EXAMPLE 1

Reactor 3 was fed with 1163 grams/hr. of butadiene and 1290 grams/hr. of chlorine flowing through conduits 1 and 2, respectively. The reactor temperature was 250° C. for an internal pressure of 766 mm. of Hg. The reaction gases were cooled in cooler 4 down to substantially 20° C., and 2400 grams/hr. of condensate were obtained in container 7. Unreacted gaseous butadiene was used as recycle gas and returned to reactor 3, through conduits 5 and 10. A mixture of butadiene/1-chlorobutadiene-(1,3)/nitrogen coming from stripping column 8 and flowing through conduit 10 was added to the recycle gas so as to have a total quantity of 1.475 cubic meters/hr. which was circulated by pumping. The temperature prevailing in the reactor was controlled by the molar ratio of butadiene/chlorine, which were used in the ratio of substantially 4.6:1. Butadiene was added through conduit 1 and gas (0.16 cubic meter/hr.) was removed through branch conduit 6 so as to establish in the recycle gas a nitrogen concentration corresponding to a molar ratio of butadiene:nitrogen of about 10:1. The condensate obtained in container 7, which was composed of (weight percent)

| | Percent | B.P. under 760 mm. of Hg (° C.) |
|---|---|---|
| Butadiene | 6.5 | −4.5 |
| 1-chlorobutadiene-(1,3) | 0.3 | 68 |
| 3,4-dichlorobutene-1 | 34.9 | 115 |
| cis-1,4-dichlorobutene-2 | 10.6 | 152–155 |
| trans-1,4-dichlorobutene-2 | 44.7 | 152–155 |
| High-boiling contaminants | 2.8 | >155 |
| Low-boiling contaminants | 0.2 | <115 | was introduced into heatable stripping column 8 (temperature prevailing in column base: 68° C./760 mm. Hg).

Butadiene, 1-chlorobutadiene-(1,3) and low-boiling contaminants were expelled overhead through conduit 10 by means of 15 liters/hr. of nitrogen flowing through conduit 9. In the column base, there were obtained 2235 grams/hr. of a product composed of (weight percent):

| | Percent |
|---|---|
| Butadiene | 0.05 |
| 1-Chlorobutadiene-(1,3) | 0.07 |
| 3,4-Dichlorobutene-1 | 36.7 |
| cis-1,4-Dichlorobutene-2 | 11.6 |
| trans-1,4-Dichlorobutene-2 | 48.2 |
| High-boiling contaminants | 3.3 |
| Low-boiling contaminants | 0.09 |

The base product travelling through conduit 11 was mixed with 332 grams/hr. of distillate coming from distilling column 15 (conduit 16) and isomerized in isomerization reactor 12 in contact with a CuCl-catalyst. The isomerization was effected at a reaction temperature of 95° C./100 mm. Hg and a reflux ratio of 10:1. 2130 Grams/hr. of 3,4-dichlorobutene-1 with the following purity (weight percent) were obtained:

| | Percent |
|---|---|
| Butadiene | 0.05 |
| 1-Chlorobutadiene-(1,3) | 0.3 |
| 3,4-Dichlorobutene-1 | 98.8 |
| cis-1,4-Dichlorobutene-2 | 0.1 |
| trans-1,4-Dichlorobutene-2 | 0.06 |
| High-boiling contaminants | 0.5 |
| Low-boiling contaminants | 0.1 |

430 Grams/hr. of base product were simultaneously removed through conduit 14 and fractionated in distilling column 15 (distillation conditions: 100° C./65 mm. Hg; reflux ratio: 10:1). 332 Grams/hr. of a distillate of the following composition (weight percent) were obtained, which were recycled through conduit 16 to isomerization reactor 12, in the manner already described:

| | Percent |
|---|---|
| Butadiene | 0.01 |
| 1-Chlorobutadiene-(1,3) | 0.1 |
| 3,4-Dichlorobutene-1 | 4.0 |
| cis-1,4-Dichlorobutene-2 | 10.2 |
| trans-1,4-Dichlorobutene-2 | 77.5 |
| High-boiling contaminants | 8.0 |
| Low-boiling contaminants | 0.2 |

The product obtained in the base of column 15 (98 grams/hr.) was discarded.

The chlorination and isomerization were effected over a period of 25 days with constant yields in the absence of any disturbances. 3,4-Dichlorobutene-1 was obtained in a total yield of 92.7%, based on the chlorine used.

EXAMPLE 2 (Comparative Example)

The procedure described in Example 1 was repeated save that the step of recycling the head product of stripping column 8 to reactor 3 was omitted. The condensate obtained in container 7 was found to contain merely 2.1 weight percent of high-boiling contaminants. The concentration of the remaining constituents was substantially unchanged.

On comparing Example 1 with Example 2 it is seen that 1-chlorobutadiene-(1,3) which affects the isomerization can be converted to harmless high-boiling contaminants by recycling it to the chlorination reactor.

EXAMPLE 3 (Comparative Example)

The procedure described in Example 1 was repeated save that stripping column 8 was operated in the absence of the nitrogen propellent gas. The base product, which was found to still contain 0.3 weight percent of 1-chlorobutadiene-(1,3), was introduced into isomerization column 12. The yield of 3,4-dichlorobutene-1 was found to decrease after 5 days of operation. After 7 days, a viscous oil was found to have been formed which made further isomerization impossible.

What is claimed is:

1. A process for the manufacture of 3,4-dichlorobutene-1, wherein butadiene and chlorine are reacted continuously in a reaction zone at temperatures between 210 and 270° C.; the resulting reaction gases are cooled;

gaseous butadiene in excess is recycled to the reaction zone; condensate, which is obtained upon effecting the cooling step, and which consists essentially of 3,4-dichlorobutene-1, cis- and trans-1,4-dichlorobutenes-2, minor proportions of butadiene, 1-chlorobutadiene-(1,3) and high boiling contaminants ($bp_{760}>155°$ C.) is introduced into a stripping zone; the condensate is stripped therein, leaving a base product, at temperatures between 40 and 120° C. by passing nitrogen gas therethrough, so as to isolate 1-chlorobutadiene-(1,3) and butadiene overhead and recycle them to the reaction zone, in which the 1-chlorobutadiene-(1,3) is converted to high-boiling, higher-chlorinated substances, and thereafter said base product containing the remainder of said condensate therein is delivered to an isomerization stage; 1,4-dichlorobutene-2 in said remainder is heated to temperatures between 85 and 110° C. in the presence of a catalyst containing CuCl and thereby isomerized therein to 3,4-dichlorobutene-1; the 3,4-dichlorobutene-1 is distilled off continuously overhead and a residual base product is delivered to a distilling zone maintained at temperatures between 85 and 110° C.; distillate, which substantially contains 1,4-dichlorobutene-2 is removed overhead under reduced pressure and recycled to the isomerization stage; and the high-boiling contaminants ($bp_{760}>155°$ C.), which accumulate in the bottom portion of the distilling zone, are removed therefrom.

2. The process as claimed in claim 1, wherein the nitrogen gas, which is continuously passed through the stripping zone, is partially removed together with proportionate fractions of butadiene and 1-chlorobutadiene-(1,3) from the reaction cycle at a place between the stripping zone and the reaction zone, and the butadiene is recovered therefrom.

References Cited

UNITED STATES PATENTS

| | | | |
|---|---|---|---|
| 3,515,760 | 6/1970 | Wild | 260—654 R |
| 3,584,065 | 6/1971 | Oshima | 260—65 |
| 3,140,244 | 7/1964 | Simek et al. | 260—654 S X |
| 2,928,884 | 3/1960 | Bellringer et al. | 260—654 H |
| 2,912,471 | 11/1959 | Capp et al. | 260—654 R |

FOREIGN PATENTS

| | | | |
|---|---|---|---|
| 800,787 | 9/1958 | Great Britain | 260—654 H |
| 984,094 | 2/1965 | Great Britain | 260—654 H |
| 798,027 | 7/1958 | Great Britain | 260—654 H |
| 676,691 | 7/1952 | Great Britain | 260—654 H |

HOWARD T. MARS, Primary Examiner

U.S. Cl. X.R.

260—654 H